United States Patent [19]
Richards

[11] 3,799,002
[45] Mar. 26, 1974

[54] TRANSMISSION WITH RESILIENTLY LOADED MAIN SHAFT GEARS

[75] Inventor: Elmer A. Richards, Kalamazoo, Mich.

[73] Assignee: Eaton Corporation, Cleveland, Ohio

[22] Filed: July 31, 1972

[21] Appl. No.: 276,376

Related U.S. Application Data

[63] Continuation-in-part of Ser. No. 60,269, Aug. 3, 1970, abandoned.

[52] U.S. Cl.................. 74/745, 74/331, 192/48.91, 74/372
[51] Int. Cl. ...... F16h 3/02, F16h 3/08, F16d 21/02
[58] Field of Search ............ 74/745, 371, 372, 331; 192/48.91

[56] References Cited
UNITED STATES PATENTS

| | | | |
|---|---|---|---|
| 2,886,982 | 5/1959 | Thomas | 74/745 |
| 3,105,395 | 10/1963 | Perkins | 74/745 |
| 3,237,472 | 3/1966 | Perkins et al. | 74/331 |
| 3,283,613 | 11/1966 | Perkins | 74/745 |
| 3,335,616 | 8/1967 | Perkins | 74/331 |
| 3,425,290 | 2/1969 | Perkins | 74/331 |
| 3,498,155 | 3/1970 | Ivanchich et al. | 74/745 |
| 3,500,695 | 3/1970 | Keiser | 74/331 |
| 3,645,147 | 2/1972 | Fodrea | 74/745 X |

FOREIGN PATENTS OR APPLICATIONS

| 694,860 | 9/1930 | France | 74/339 |
|---|---|---|---|

*Primary Examiner*—Arthur T. McKeon
*Attorney, Agent, or Firm*—Woodhams, Blanchard & Flynn

[57] ABSTRACT

A shiftable change speed gear system, particularly a transmission, having resilient shifting mechanisms for simplying the transmission structure and the shifting thereof. The transmission is preferably provided with multiple countershafts having countershaft gears thereon disposed in meshing engagement with main shaft gears encircling the transmission main shaft, said main shaft gears being supported on and solely by the countershaft gears. The main shaft gears are axially movable relative to the main shaft by conventional means for effecting shifting of the transmission. The main shaft gears cooperate with clutch rings which surround and are supported on and for rotation with the main shaft, the clutch rings also being axially movable relative to the main shaft and being resiliently urgeable in a direction toward the respective main shaft gear with which same cooperates, whereby shifting of the main shaft gear toward its respective clutch ring causes resilient axial movement of the latter until synchronization is achieved to permit the clutch ring to move axially in response to said resilient urging and engage the main shaft gear. The transmission, in one modification thereof, is provided with a range section which also incorporates a shiftable main shaft gear therein, the main shaft of the transmission comprising a single shaft which extends continuously through both the main transmission section and the range section.

28 Claims, 9 Drawing Figures

PATENTED MAR 26 1974

INVENTOR
ELMER A. RICHARDS
BY
Woodhams, Blanchard & Flynn
ATTORNEYS

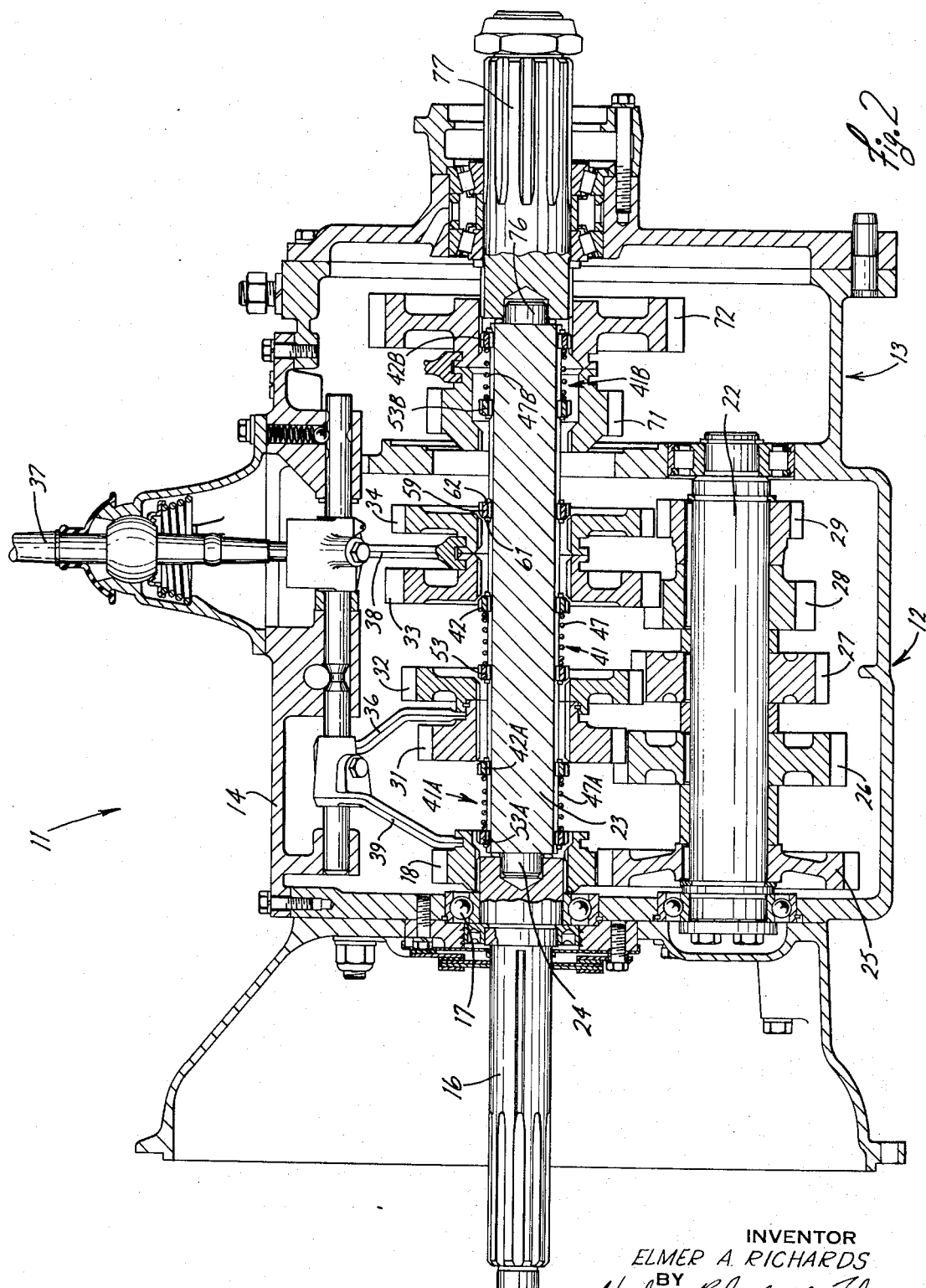

TRANSMISSION WITH RESILIENTLY LOADED MAIN SHAFT GEARS

This application is a continuation-in-part of U.S. Ser. No. 60,269 filed Aug. 3, 1970, now abandoned.

FIELD OF THE INVENTION

This invention relates to a shiftable change speed gear device and particularly relates to a transmission, preferably a multiple countershaft transmission, having resiliently yieldable shifting mechanisms for substantially simplifying shifting of the transmission.

BACKGROUND OF THE INVENTION

In the design of transmissions, particularly heavy duty transmissions such as used on trucks, there has existed for a long time the problem of shifting the transmission through the various speed ratios, which problem is even greater when the transmission is provided with an auxiliary or range transmission section for increasing the number of speed ratios. In most known transmissions, the shifting process is either relatively difficult and/or the shifting mechanism is relatively complex. Thus, there has been a continuing effort in the design of transmissions to provide the shifting, to improve the rapidity of shifting, to produce the complexity of the shifting mechanism and to reduce its cost. Hence, without detracting from the operability or desirability of many of the shifting mechanisms previously known, it may be stated that in the present invention these general objectives are accomplished to even a greater degree than has been previously known.

Particularly, most known transmissions have necessarily utilized synchronizers, of which many different types are known, for causing the speed of the jaw or toothed clutch members to be substantially synchronized prior to permitting their interengagement during a shifting sequence from one speed ratio to another speed ratio. While the use of synchronizers does permit the shifting operation to be performed, nevertheless the use of synchronizers is, in many instances, undesirable since not only do synchronizers increase the mechanical complexity of the transmission, but they also occupy additional space so that the transmission is necessarily larger and heavier and is likewise of increased cost. The synchronizers also undergo substantial wear and thus require periodic maintenance. Accordingly, there has long existed a need for a successful heavy duty transmission which can be successfully operated for long periods of time without requiring the use of conventional synchronizers and yet one which will permit successful and simple shifting thereof.

A further disadvantage of many known transmissions, including those utilizing conventional synchronizers, is the large amount of effort or force which must be exerted by the vehicle driver in order to successfully shift from one speed ratio to another. The shifting operation in such known transmissions generally requires that the operator apply a force through a shifting linkage so as to move one jaw clutch member axially into meshing engagement with another jaw clutch member. Furthermore, the force which must be exerted by the driver to perform the shifting is often of a substantial magnitude. The necessity of exerting such effort to permit the shifting operation to be performed is obviously undesirable since under conditions of frequent shifting, such as heavy traffic or mountain driving, it may be extremely tiring for the driver.

Still another disadvantage of the shifting mechanisms of known transmissions is the length of time required for the shifting operation to be performed. Most known transmissions, due to the necessity of having synchronizers and other related structure, have necessarily provided a substantial amount of mass on the main transmission shaft. Such mass considerably increases the inertia of the transmission main shaft so that a synchronized speed condition can be rapidly achieved only by the use of large synchronizers. This results in still further size and expense.

Further, in transmissions provided with a range or auxiliary section, the above problems are even more difficult and complex. Particularly, when the auxiliary transmission is set to produce a first range of speeds, the speed of the engine must be altered to a predetermined extent to shift the main transmission section from one ratio to the next. However, when the auxiliary transmission is set to produce a second range of speeds, the engine speed must be altered a different amount in order to shift the gears in the main transmission. Thus, when it is necessary to make both a range and a main transmission shift, driving of the vehicle with many of the known transmissions has been difficult since it has required either a complex control mechanism or a conscious and physical effort by the driver to shift through the two ranges of speed.

Accordingly, it is an object of the present invention to provide a transmission having an improved shifting structure for overcoming the above-mentioned disadvantages. Particularly, it is an object of the present invention to provide:

1. A transmission having means to improve the ease of shifting, to improve the rapidity without requiring large synchronizers, to reduce the complexity of the mechanism and to reduce its cost.

2. A transmission, as aforesaid, having a shifting mechanism which does not require the use of conventional synchronizers.

3. A transmission, as aforesaid, which utilizes resilient means for causing meshing engagement of the jaw clutch members after the desired speed synchronization has been achieved.

4. A transmission, as aforesaid, having a main shaft assembly possessing a minimum of inertia whereby to eliminate the need for synchronizers.

5. A transmission, as aforesaid, having the main shaft gears floatingly supported relative to the main shaft by a plurality of countershaft gears so as to minimize the inertia of the main shaft, and including clutch collars keyed to the main shaft for cooperation with the main shaft gears.

6. A transmission, as aforesaid, wherein the clutch collars are resiliently axially urged toward the respective main shaft gears, with the main shaft gears being axially shiftable for meshing engagement with their respective clutch collars, each gear and associated clutch collar being provided with conical cooperating faces disposed for engagement with one another prior to synchronization of the members whereupon the resilient means causes the clutch collar to meshingly engage the main shaft gear when the desired synchronization is achieved.

7. A transmission, as aforesaid, particularly having both a main transmission section and a range or auxiliary transmission section for increasing the number of speed ratios including a single and continuous main shaft extending through both the main and range sections for minimizing the inertia and simplifying the ease and rapidity of shifting.

8. A transmission, as aforesaid, which permits shifting to occur without requiring depression of the clutch pedal and disconnection of the drive clutch, and which permits a vehicle, such as a truck, to be easily driven and shifted even by an inexperienced driver.

Other objects and purposes of the invention will be apparent to persons acquainted with devices of this type upon reading the following specification and inspecting the accompanying drawings.

BRIEF DESCRIPTION OF THE DRAWINGS

FIG. 2 is a cross sectional view of a transmission as taken substantially along the line II—II of FIG. 5.

Figure 1:
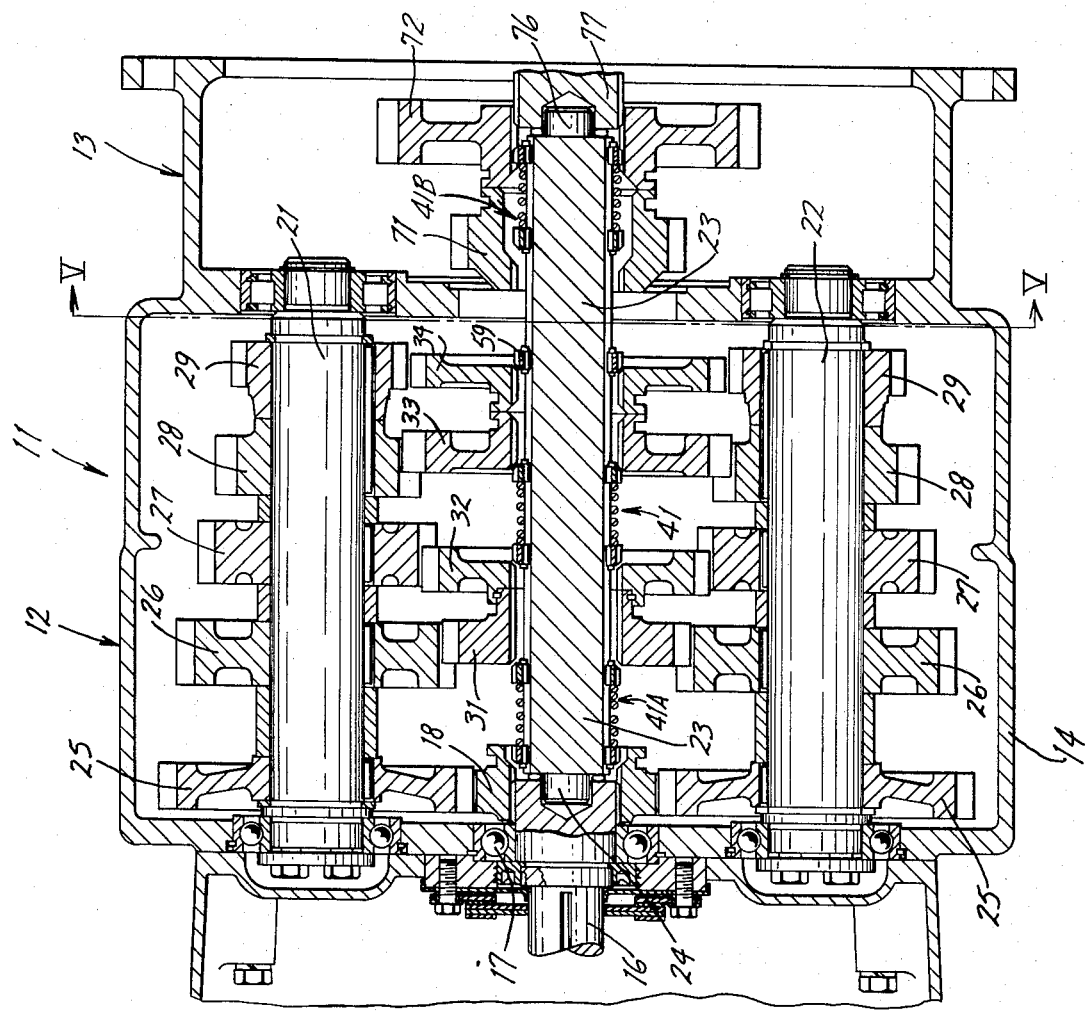
FIG. 1 is a cross-sectional view of a transmission constructed according to the present invention, as taken substantially along the line I—I of FIG. 5.

Certain terminology will be used in the following description for convenience in reference only and will not be limiting. The words "upwardly," "downwardly," "rightwardly" and "leftwardly" will designate directions in the drawings to which reference is made. The words "forward" and "rearward" will refer respectively to the front and rear ends of the transmission as same is conventionally mounted in the vehicle, being respectively the left and right sides of the transmission as illustrated in FIGS. 1 and 2. The words "inwardly" and "outwardly" will refer to directions toward and away from, respectively, the geometric center of the device and designated parts thereof. Said terminology wil include the words above specifically mentioned, derivatives thereof and words of similar import.

SUMMARY OF THE INVENTION

The objects and purposes of the present invention are met by providing a transmission having yieldable shifting mechanisms together with cooperating arrangements which not only improve the ease and rapidity of shifting, but also substantially simplify the transmission structure and decrease the rotational inertia. The transmission preferably includes a plurality of countershafts each having an identical set of countershaft gears thereon. Main shaft gears encircle the transmission main shaft and are supported on and by the countershaft gears and in continuous meshing engagement therewith. By virtue of such mounting, the main shaft gears are floatable with respect to the axis of the main shaft. The yieldable shifting mechanism preferably includes a movable jaw clutch member resiliently urged toward engaged position for resiliently causing engagement to occur after the desired synchronized speed condition has been achieved. According to a preferred embodiment of the invention, the shifting mechanism includes a shifting linkage interconnected to the main shaft gears for causing axial shifting thereof relative to the main shaft, which main shaft gears are disposed for meshing engagement with annular shift collars nonrotatably disposed on the main shaft, the shift collars being axially movable relative to the main shaft and resiliently urged against a stop by resilient means, such as springs. The meeting faces of the main shaft gear and the clutch collar are provided with cooperating conical surfaces whereby axial shifting of the main shaft gear against the shift collar causes same to be axially displaced so as to compress the spring until the desired speed synchronization is achieved, whereupon the spring causes the collar to move axially so as to meshingly engage the main shaft gear.

In a further preferred modification of the improved transmission constructed according to the present invention, the transmission is provided with both a main transmission section and a range or auxiliary transmission section, both of which are provided with improved yieldable shifting mechanisms therein constructed according to the present invention. Further, the transmission is preferably provided with a single and continuous main shaft extending through both the main and range sections with all of the main shaft gears in both the range and main sections being rotatable and concentrically disposed about the main shaft, whereby the rotational inertia of the main shaft is substantially minimized to facilitate shifting of the transmission, particularly when shifting both the range and main sections.

DETAILED DESCRIPTION

Referring to the drawings, there is illustrated a transmission 11 having both a main transmission section 12 and a range or auxiliary transmission section 13, each of which has a plurality of selectable ratios. The main and range sections are both suitably enclosed by a conventional housing 14.

The transmission 11 specifically includes an input shaft 16 supported adjacent its rearward end by a bearing 17 and provided with an input gear 18 nonrotatably connected thereto, as by splines. The input gear 18 simultaneously drives a plurality of countershafts at equal speeds. In the illustrated embodiment, the transmission is provided with two countershafts 21 and 22 disposed on diametrically opposite sides of the main shaft 23, which main shaft is coaxially aligned with the input shaft 16 and is provided with a pilot portion 24 on its forward end rotatably received within and supported by the rearward end of the input shaft 16.

Each of the countershafts 21 and 22 is provided with an identical grouping of countershaft gears 25, 26, 27, 28 and 29 thereon, which groupings form pairs of gears, such as the pair of gears 26, of identical size and number of teeth and disposed on diametrically opposite sides of the main shaft 23.

A plurality of main shaft drive gears 31, 32, 33 and 34 encircle the main shaft and are selectively clutchable thereto one at a time by yieldable clutch mechanisms, as described in greater detail hereinafter.

The main shaft gears 31, 32 and 33 encircle the main shaft 23, are in continuous meshing engagement with, and are floatingly supported by, the diametrically opposed pairs of countershaft gears 26, 27 and 28, respectively, which mounting means and the special advantages resulting therefrom are explained in greater detail in U.S. Pat. Nos. 3,105,395, and 3,335,616. The main shaft gear 34 is the reverse gear and is in continuous meshing engagement with the pair of countershaft gears 29 by means of conventional intermediate gears (not shown). The forwardmost countershaft gears 25 are continually meshed with and driven by the input gear 18 for causing simultaneous rotation of the countershafts 21 and 22 whenever the input shaft 16 is rotatably driven.

As illustrated in FIG. 2, the main shaft gears 31 and 32 are axially interconnected to form a gear pair and are connected to a conventional shift fork 36, the position of the shift fork 36 being controlled in a conventional manner by means of a shift lever 37. The main shaft gear pair 31-32 is thus shiftable axially relative to the main shaft 23 in response to axial shifting of the fork 36 by the lever 37. However, the gears 31 and 32 are independently rotatable relative to one another. In a similar manner, the main shaft gears 33 and 34 are also axially interconnected so as to be axially shiftable as a pair by means of the shift form 38, which shift fork is also controlled by means of the shift lever 37. The main shaft gear pair 33-34 is likewise axially movable relative to the main shaft 23.

The input gear 18 is also interconnected to a conventional shift form 39, which shift fork is similarly controlled by the shift lever 37 for permitting input gear 18 to be shifted axially for selectively permitting direct driving engagement between the input shaft 16 and the main shaft 23.

Figure 3:
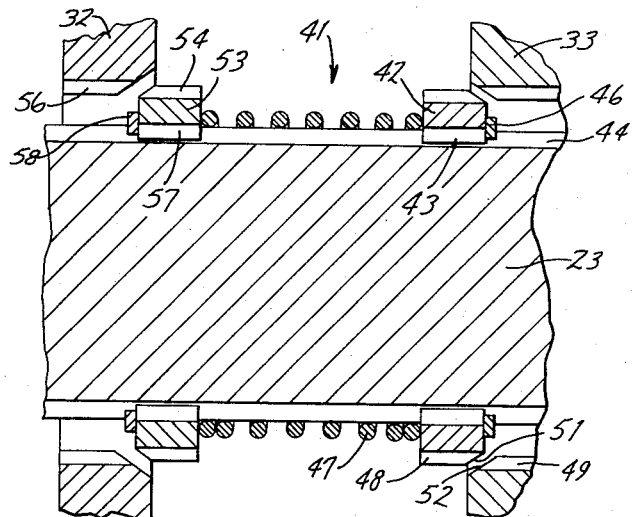
FIG. 3 is an enlarged, fragmentary view of the improved resilient clutch structure according to the present invention.

The yieldable clutch structure, as illustrated in detail in FIG. 3, is generally designated 41 and includes an annular clutch collar 42 encircling the main shaft 23. The clutch collar 42 is provided with internal splines 43 which are disposed within corresponding external splines 44 provided on the main shaft 23 for interconnecting the clutch collar 42 to the main shaft 23 for rotation therwith. However, the cooperating splines 43 and 44 permit the clutch collar 42 to freely slide axially relative to the shaft 23. A stop ring 46 is seated within a suitable groove formed on the external periphery of the shaft 23 and is disposed for contacting the clutch collar 42 and limiting the axial movement thereof. The collar 42 is normally resiliently urged by means of a spring 47 into abutting engagement with the stop ring 46.

The clutch collar 42 is provided with external teeth 48 thereon which are adapted to meshingly engage the internal teeth 49 provided on one of the main shaft gears, such as the gear 33. The teeth 48 on the clutch collar 42 are tapered, as at 51, and in a similar manner the leading edge of the teeth 49 on the main shaft gear 33 are similarly tapered as at 52. The confronting tapered conical surfaces 51 and 52 each extend at an angle of preferably between 30 and 40 degrees relative to the longitudinal axis of the main shaft 23. The exact degree of taper, and the advantages thereof, are explained in detail in U.S. Pat. No. 3,265,173. The other end of the spring 47 resiliently acts against a further clutch collar 53, which collar is identical to the collar 42 but is disposed so that it has the tapered leading end of its teeth facing in the opposite direction. The clutch collar 53 has external teeth 54 which are adapted to meshingly engage the internal teeth 56 provided on the main shaft gear 32, the leading edges of the teeth 54 and 56 each being tapered in a manner similar to the tapered surfaces 51 and 52 as explained in detail above. The clutch collar 53 is also provided with internal splines 57 for nonrotatably but axially slidably engaging the main shaft 23. The clutch collar 53 is resiliently urged by the spring 47 into a position whereby it normally abuttingly contacts a further stop ring 58.

A further resilient clutch assembly 41A is disposed concentrically to the main shaft 23 and positioned between the main shaft gear 31 and the input gear 18. The yieldable clutch assembly 41A is identical to the clutch assembly 41 and is disposed for meshing engagement with the internal teeth of either of the main shaft gear 31 or the input gear 18.

The main shaft 23 is additionally provided with a further clutch collar 59 concentrically and nonrotatably mounted thereon, which clutch collar 59 is identical to the clutch collar 42 described above. However, the clutch collar 59 is axially confined relative to the main shaft 23 by stop rings 61 and 62 disposed on the opposite axial sides thereof. The clutch collar 59 is disposed for meshing engagement with the internal teeth of the main shaft gear 34 when said gear 34 is shifted rightwardly from the position illustrated in FIG. 2. The clutch collar 59 is not resiliently loaded or biased as is true of the clutch assemblies 41 or 41A since the clutch collar 59 is utilized only when the transmission is driving in reverse, and thus the resilient loading of the clutch collar is not necessary. However, a spring could obviously be provided for resiliently loading the clutch collar 59 if so desired.

Figure 4:
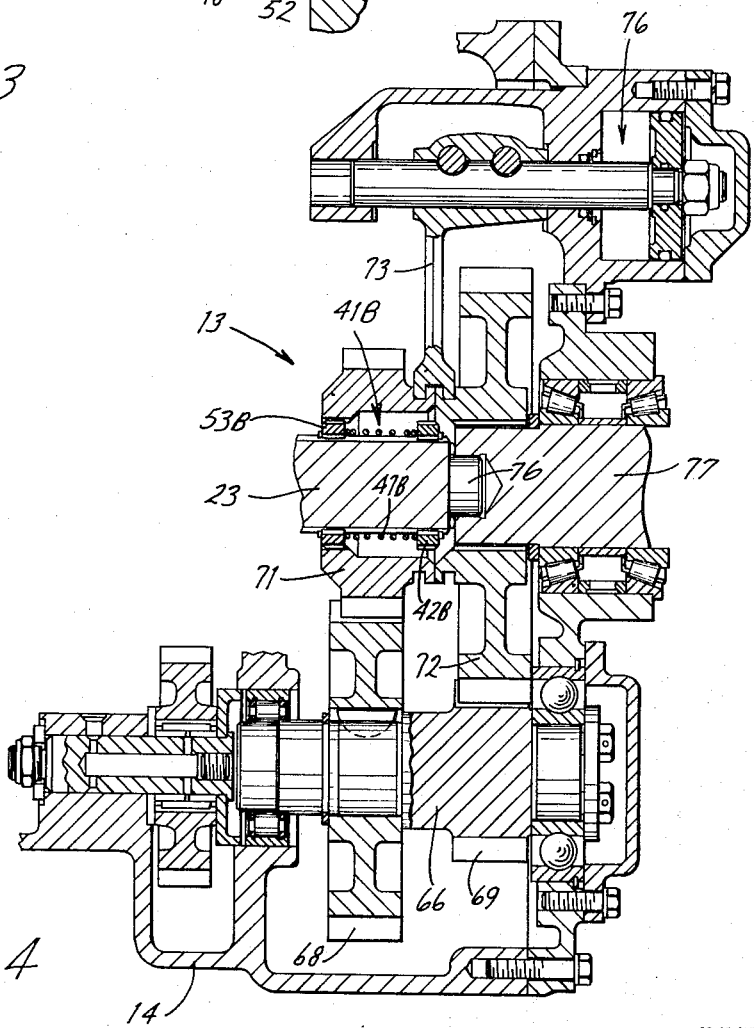
FIG. 4 is a sectional view as taken substantially along the line IV—IV of FIG. 5.

Considering now the range section 13, same includes a plurality of countershafts 66 and 67 (FIG. 5) each having an identical grouping of countershaft gears 68 and 69 (FIG. 4) thereon. The first pair of countershaft gears 68 are disposed diametrically opposite and in continuous meshing engagement with a main shaft gear 71, which main shaft gear is floatingly supported by the pain of countershaft gears 68 for substantially concentrically encircling the main shaft 23. A further mainshaft gear 72 is also floatingly and substantially concentrically supported relative to the main shaft 23 by the other pair of countershaft gears 69. The pair of main shaft gears 71 and 72 are axially interconnected and axially movable relative to the main shaft 23 by a further shift fork 73 which shift fork is connected to and movable by any automatically controllable power means, such as a piston structure 76. The piston structure 76 is shiftable in a conventional manner, such as by means of a manually actuated, preferably preselectable, range shift button or lever provided in the vehicle occupant compartment, which in turn controls a valve (not shown) for supplying pressure fluid to the piston structure.

As illustrated in FIG. 2, the main shaft 23 extends continuously through not only the main transmission section 12, but also through the range transmission section 13. The rearward end of the main shaft 23 is provided with a pilot portion 76 which is rotatably received and supported within the end of the output shaft 77.

The range section main shaft gears 71 and 72 are each individually clutchably engagable with the main shaft 23 by means of a resilient clutch assembly 41B, which assembly is identical to the assembly 41 described above. The assembly 41B includes clutch collars 42B and 53B splined on the main shaft 23 and resiliently urged axially in opposite directions by means of the intermediate spring 47B. The external teeth formed on the clutch collars 42B and 53B are adapted to respectively meshingly engage the internal teeth formed on the main shaft gears 72 and 71, respectively. The internal teeth on the main shaft gear 72 are also disposed in meshing engagement with corresponding external teeth formed on the output shaft 77 as illustrated in FIG. 2.

OPERATION

The operation of the transmission constructed according to the present invention will be briefly described to insure a more complete understanding thereof.

Assuming first that both the main section 12 and the range section 13 are to be in low gear, then the main shaft gear 33 will be clutchably engaged with the main shaft 23 by means of the intermediate clutch collar 42, and the pair of main shaft gears 71-72 will be shifted rearwardly (rightwardly in FIG. 2) so that main shaft gear 71 will be clutchably engaged to the main shaft 23 by means of the clutch collar 53B while the main shaft gear 72 will be disengaged from the clutch collar 42B. Thus, when in low gear, power will be transmitted from the input shaft 16 to input gear 18 and through the pair of countershaft gears 25 so as to cause identical rotation of the countershafts 21 and 22. Rotation of the countershafts causes a corresponding rotation of the pair of countershaft gears 28, which in turn cause rotation of main shaft gear 33 which then drives main shaft 23. Main shaft 23 drives the main shaft gear 71 which transmits torque through the countershaft gears 68 and 69 to the further main shaft gear 72, which is drivingly connected directly to the output shaft 77 for causing rotation thereof.

After the vehicle has been put into motion and it is desired to shift into second gear, the driver will move the shift lever 37 so as to move the shift fork 38 and the gear pair 33-34 rearwardly (rightwardly in FIG. 2) to disengage the main shaft gear 33 from the clutch collar 42. The main transmission is now in neutral. The shifting movement of the shift lever 37 is continued to cause a rearward shifting (rightwardly in FIG. 2) of the shift fork 36 and the gear pair 31-32 whereupon the tapered face on the main shaft gear 32 will contact the tapered surface on the clutch collar 53. However, since the gear 32 will be rotating faster than the collar 53, the collar will not meshingly engage the gear 32 and thus the collar 53 will be moved axially (rightwardly in FIG. 2) in opposition to the spring 47. In order to synchronize the speeds of the gear 32 and the collar 53, the vehicle operator will release the vehicle throttle or accelerator (supplemented if desired for still faster operation by a conventional countershaft brake) so as to decrease the speed of the input shaft 16, whereupon the gear 32 will slow down to approach the speed of the collar 53. When the desired synchronization between the two members is achieved, the spring 47 will cause the collar 53 to move forwardly (leftwardly in FIG. 2) so as to automatically meshingly engage the gear 32 and thereby drivingly couple gear 32 to the main shaft 23.

When it is desired to shift into the third speed ratio, the shift fork 36 and the gear pair 31-32 will be moved leftwardly so as to cause gear 32 first to disengage collar 53 and then to cause gear 31 to contact the clutch collar 42A. Since the gear 31 is rotating faster than the collar 42A, the collar 42A will be moved axially leftwardly against the urging of the spring 47A until the engine speed has decreased sufficiently to provide a substantially synchronized speed condition, whereupon the spring will then cause the collar 42A to move axially rightwardly so as to meshingly engage the gear 31.

In a similar manner, when it is desired to shift into fourth gear, shift fork 36 will first be moved rightwardly to disengage gear 31 from clutch collar 42A and then shift fork 39 will be moved rightwardly to cause the input gear 18 to contact the clutch collar 53A, which collar will be axially moved in opposition to the resilient urging of spring 47A until a synchronized speed condition is achieved, whereupon the collar 53A will be moved axially leftwardly to engage the input gear 18 to provide for a direct driving connection between the input shaft 16 and the main shaft 23

In order to shift into the fifth speed ratio, it is necessary to perform not only a shifting in the main transmission section, but it is also necessary to perform a shifting within the range section. Thus, to shift to the fifth speed ratio, both the range shift control (not shown) and the shift lever 37 are actuated. Preferably, as in the U.S. Pat. to Ludvigsen and Backus No. 2,637,221, the range shift is preselected and then caused to operate automatically upon the shift lever entering its neutral position. Thus, after appropriate preselection of the range shift control as set forth in said patent, the shift lever 37 is actuated to move the shift fork 39 forwardly, thereby disengaging gear 18 from clutch collar 53A and the main transmission is again in neutral. The range control, being now actuated, causes the piston 76 to be moved forwardly (leftwardly) from the position illustrated in FIG. 4, whereupon the gear 71 disengages the clutch collar 53B and the gear 72 contacts the clutch collar 42B and causes same to move axially leftwardly in opposition to the resilient urging of the spring 47B. In this condition, the main shaft 23 is disconnected from the output shaft 77 and, since the shaft 23 has no large structures mounted thereon, it possesses little inertia so that the shaft 23 will rapidly slow down to achieve a speed synchronization with the output shaft 77. When this occurs, the spring 47B will cause the clutch collar 42B to move axially rightwardly to meshingly engage the main shaft gear 72 so as to drivingly connect the main shaft 23 directly to the output shaft 77, as illustrated in FIG. 2.

Continuing movement of the shift lever 37 toward its fifth speed ratio position causes the gear 33 again to move axially leftwardly (low ratio position) so as to contact the clutch collar 42, which clutch collar will again be axially displaced and, when speed synchronization is achieved, will be axially moved rightwardly by the spring 47 so as to meshingly engage with the gear 33.

The sequence in shifting from the fifth to eighth speed ratio is identical to the sequence involved in shifting from the first to fourth speed ration as described in detail above.

Down shifting is carried out in the reverse manner to that described above. During a down shift, such as from the sixth to the fifth speed ratio (or from the second to the first speed ratio), gear 32 will be shifted leftwardly to disengage the clutch collar 53, and gear 33 will also be shifted leftwardly to contact the clutch collar 42, which clutch collar will be moved axially leftwardly in opposition to the spring 47 due to the difference in speed between the gear 33 and the clutch collar 42, the gear 33 being rotated at a slower speed than the clutch collar during down shifting. Accordingly, after gear 32 has disengaged the clutch collar 53, the driver of the vehicle will slightly depress the vehicle throttle or accelerator so as to increase the engine speed sufficiently to increase the speed of gear 33 to synchronize it with the speed of clutch collar 42. When this is accomplished, the spring 47 will automatically urge the clutch collar 42 axially (rightwardly in FIG. 2) into meshing engagement with the internal teeth of the gear 33, thereby completing the down shift.

Other downshifts are similar and will be apparent from the foregoing. The resilient clutch structure of the present invention, as particularly illustrated in detail in FIG. 3, is highly desirable since in association with the other transmission components it results in minimizing the mass mounted on and rotatable with the main shaft, thereby minimizing the inertia of the main shaft. Further, the illustrated resilient clutch structure requires only a small space, thereby permitting the overall transmission length to be minimized. Further, since the shiftable main shaft gears are floatingly mounted by the adjacent countershaft gears and are not directly connected to the main shaft, the main shaft gears exert no frictional drag on the main shaft, either during shifting or when positioned in the idle condition.

A further advantage of the yieldable clutch structure illustrated in FIG. 3 is that it develops an engagement force which is independent of the force imposed on the shift lever 37. Further, the engagement force, as determined by the strength of the spring 47, can be individually designed for each speed ratio so as to provide for a minimum engagement force, thereby likewise minimizing wear. For example, at the low speed ratios, the shiftable sleeve collar may require either a larger mass or a lesser engagement force in order to control the engagement thereof with its respective main shaft gear at the desired synchronized speed. On the other hand, at the higher speed ratios, the engagement force can be increased or the mass of the shift collar can be reduced while still permitting control over engagement of the collar with its respective main shaft gear at the desired synchronized speed. The yieldable clutch structure according to the present invention is thus well suited for this type of operation since the mass of the individual shiftable clutch collars 42 and 53 and the engagement force developed within a spring 47 can be individually designed so as to provide a minimum engagement force depending upon whatever main shaft gear cooperates with the shiftable clutch collar. This optimum and independent design of shiftable clutch assembly obviously results in minimizing the time required to effect a shift.

In the embodiment illustrated the clutch collars are all of the same size and such in an effective arrangement. However, in some instances there will be advantages in providing clutch units wherein one clutch thereof has a larger diameter than another clutch thereof. This permits a close accommodation of each clutch unit to the speed conditions to which it is subjected inasmuch as the larger diameter permits a larger number of teeth and thus provides interengageable conditions at a larger number of rotative positions.

While the foregoing described embodiments operate effectively it has been noted in actual experience therewith that under some conditions of operation, particularly when same are operating under heavy load such as to cause extremely rapid changes in relative speed between the parts being shifted, the interengaging pieces sometimes rake and wear excessively and sometimes the interengaging teeth of clutch parts will grip and commence driving before the interengagement thereof is fully completed. When this latter situation occurs so that the interengaging contact between the engaged clutch teeth is less than the full length of the teeth, the compressive forces developed against such teeth become greater than that for which the teeth were designed and failure may occur. It is therefore desirable in these instances to provide means insuring that the clutch teeth will fully engage before load is imposed thereon.

In some cases this can be accomplished merely by increasing the backlash of one set of teeth or the other whereby to provide more space for receiving the interengaging teeth into each other. However, this is of only limited value and does not solve the problem in the more serious cases.

Figure 5:
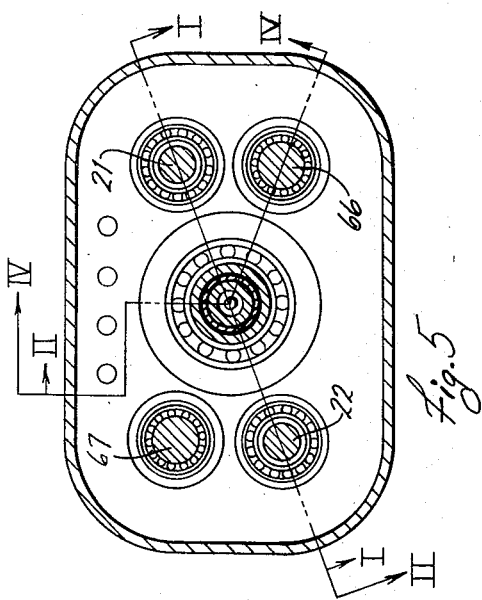
FIG. 5 is a sectional elevational view as taken along the line V—V of FIG. 1.
Figure 6:
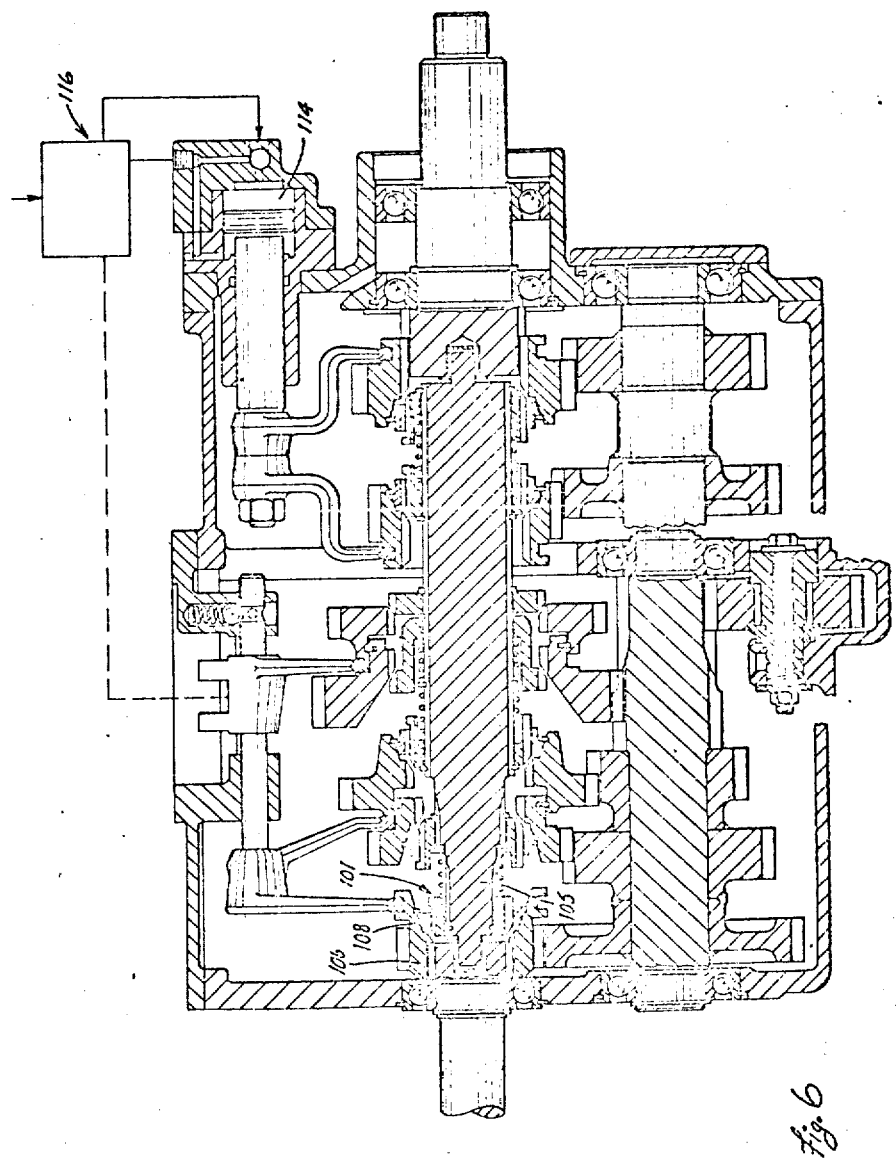
FIG. 6 is a sectional view of a modification, said section being similar to the section of FIG. 2.
Figure 8:
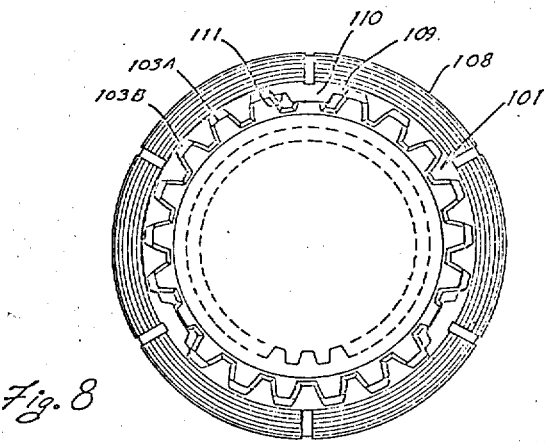
FIG. 8 is an elevation of a slidable clutch component and its associated blocker as viewed from the left in FIG. 7.
Figure 7:
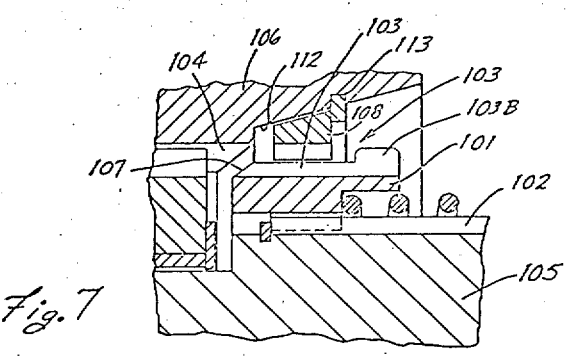
FIG. 7 is a portion of FIG. 2 on an enlarged scale.

With this in mind attention is directed to FIG. 6 which shows in a view generally similar to FIG. 2 a modified system in which blockers have been incorporated into each of the clutch units for operation therewith. In this arrangement, the clutch components of which one appears at 101 are of annular configuration and have internal splining to mate with the external splines 102 (FIG. 7) of the main shaft 105 which latter corresponds to the shaft 23 of the embodiment of FIGS. 1-5. The clutch component 101 has external teeth 103 for meshing with internal teeth 104 on the drive gear 106, said drive gear 106 generally corresponding to the gear 18 of the unit above described. The teeth 103 have a radially shorter drive zone 103a and a radially longer blocking zone 103b for purposes appearing hereinafter. Said teeth are chamfered at their mating ends 107 to mate with similarly chamfered and opposed ends of the teeth 104 for the same purposes as in the embodiment above described. In addition, as shown in FIG. 8, a selected number, here three, of the teeth 103 are removed for permitting passage of the blocking ring as hereinafter further described.

Referring now to the blockers, one thereof is indicated generally at 108 and comprises a ring encircling the clutch component 101 and has an appropriate number, here three, of radially inward projections 110 which when properly positioned will mate with the zone of the removed teeth above mentioned. Same also have sideward projections 109 for effecting the desired blocking. The inner radius 111 of the portion 109 is sufficient to clear the portion 103a of the teeth 103 while when the blocker 108 is in a laterally offset position in a manner common to such blockers the portion 109 will engage the portion 103b of the clutch component 103 and interfere with axial movement thereof.

The external surface of the blocker 108 is sloped to provide a cone clutch contact with a corresponding inner surface 112 of the gear 106. Suitable means, here a snap ring 113, is inserted into said surface 112 to limit movement of the blocker in a direction, here rightwardly, away from clutching contact with said surface 112.

The operation of the blocker 108 is generally similar to that of known blockers. For example, assuming the gear 106 is rotating more rapidly than the clutch member 101, which latter of course rotates at the same speed as the main shaft 105, the blocker 108 will tend to rotate with a gear 106, hence lead the clutch component 103 and impose one of the sideward extensions 109 in a position to interfere with the portion 103b and prevent clutching (leftward) movement of the clutch component 101. However, as the shaft 105 accelerates and a condition of synchronism is approached, the projections 110 of said blockers will become centered with the zones of the removed teeth on the periphery of the clutch component 101 and upon reversal of relative speeds the blockers will no longer block and the clutch component 101 will move into clutching condition in the usual manner.

Where the gear 106 is initially running slower than the shaft 105 the operation will be generally similar to that above described excepting that the blocker 108 will lag behind the clutch component 101 until there occurs a reversal of relative speeds at which blocking will cease and clutching will again be completed in a manner already well known for blocking devices.

The remaining blocking units shown in FIG. 6 are constructed and operate similarly and no further description is therefore needed.

Figure 9:
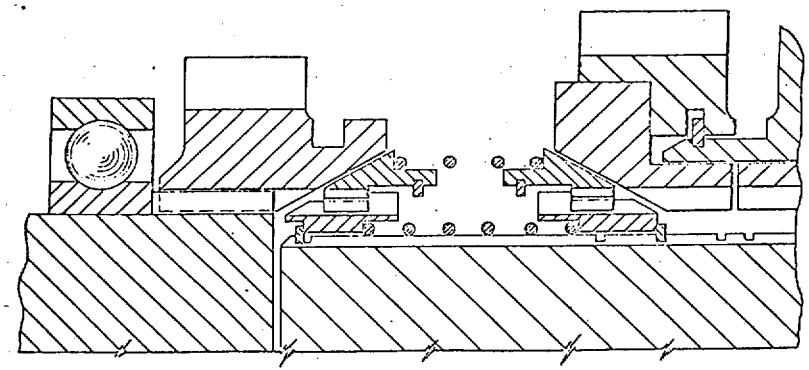
FIG. 9 shows a further modification on a section and scale similar to FIG. 7.

FIG. 9 shows a generally similar form of blocking unit wherein a spring is utilized to initiate engagement of the blockers with the respective gears with which they cooperate. Normally such spring is not needed but in instances where a more positive action of the blocker is desired, such spring will be helpful.

A further problem sometimes has developed in this system with the use of blockers in that the entire main shaft 105 is, as already described, connected solidly through the range shift gears to the propeller shaft of the vehicle. Therefore, in normal shifting of the step gears (the gears other than the range shift gears), each time such gears are moved into neutral condition the windup in the propeller shaft will be transmitted into the step shifting portion of the transmission, impose oscillations thereon and possibly disturb the operation of the blockers. It will therefore often be desirable to avoid this difficulty by providing that the gears, which in the embodiment of FIGS. 1-5 are shown as range shift gears, be instead splitter gears as shown in FIG. 6 and that the shift mechanism be so controlled that the splitter gears become disengaged prior to the disengagement of any of the step gears. One simple way to accomplish this is merely to provide the auxiliary transmission with a larger pressure fluid energized shift cylinder 114 than is provided for the main transmission. Since the same torque is applied to the gears of both transmission, this will effect pull-out of the auxiliary transmission before pull-out of the main transmission. Other control means may, of course, also be used. Thus, the main shaft 105 is isolated from the propeller shaft of the vehicle during each step shift and the effect of such windup will not disturb the operation of the blockers. The control of the shifting for both the splitter and step portions of the transmission and the interconnection of such controls are schematically indicated at 116 in FIG. 6 and may be of any conventional and presently known type.

Although particular preferred embodiments of the invention have been disclosed in detail above for illustrative purposes, it will be recognized that variations or modifications of the disclosed apparatus, including the rearrangement of parts, lie within the scope of the present invention.

The embodiments of the invention in which I claim an exclusive property or privilege are defined as follows:

1. A change speed gear device, comprising:
   first and second substantially parallel shaft members;

gear means drivingly connectible between said shaft members for providing a plurality of alternately selectable speed ratios, said gear means including a first rotatable gear member supported on said first shaft member and a second rotatable gear member substantially concentric with said second shaft member and meshable with said first gear member, and second gear member being movable axially relative to said second shaft member;
   shift means connected to said second gear member for selectively moving same axially relative to said second shaft member;
   clutch means for drivingly connecting said second gear member to said second shaft member in response to axial shifting of said second gear member, said clutch including a first annular jaw clutch member nonrotatably connected to said second gear member for rotation therewith and a second annular jaw clutch member nonrotatably mounted on said second shaft member for rotation therewith, one of said jaw clutch members being mounted for axial movement relative to its respective second member;
   said clutch means further including resilient means for resiliently urging said one jaw clutch member in a direction toward said other jaw clutch member for causing resilient meshing engagement of said jaw clutch members in response to axial shifting movement of said second gear member; and
   stop means fixedly secured to said second member associated with said one jaw clutch member, said resilient means normally urging said one jaw clutch member against said stop means when said second gear member is in a first axial position and said first and second jaw clutch members are disengaged, movement of said second gear member axially toward said second jaw clutch member causing said first jaw clutch member to contact said second jaw clutch member and move said one jaw clutch member away from said stop means in opposition to said resilient means, whereby said resilient means causes said one jaw clutch member to again relatively move axially in the opposite direction so as to meshingly engage said other jaw clutch member when substantial speed synchronization is achieved therebetween.

2. A device according to claim 1, wherein said second jaw clutch member is mounted for axial movement relative to said second shaft member, and said first jaw clutch member is axially stationary relative to said second gear member.

3. A device according to claim 2, wherein said first jaw clutch member comprises a first annular set of teeth fixedly interconnected to said second gear member for rotation therewith, and said second jaw clutch member comprises an annular collar having a second annular set of teeth thereon disposed for coaction with said first annular set of teeth, said resilient means comprising spring means disposed in concentric relationship to said second shaft member and coacting with said second jaw clutch member for urging same toward said first jaw clutch member.

4. A change speed gear device, comprising:
first and second substantially parallel shafts;
gear means drivingly connected between said shaft for providing a plurality of alternately selectable speed ratios, said gear means including a first rotatable gear supported on said first shaft and a second rotatable gear substantially concentric with said second shaft and meshable with said first gear, said second gear being movable axially relative to said second shaft;
shift means connected to said second gear for selectively moving same axially relative to said second shaft;
clutch means for drivingly connecting said second gear to said second shaft in response to axial shifting of said second gear, said clutch means including a first annular set of teeth fixedly interconnected to said second gear for rotation therewith;
said clutch means also including an annular jaw clutch member mounted on said second shaft for rotation therewith, said jaw clutch member being mounted for axial movement relative to said second shaft and comprising an annular collar having a second annular set of teeth thereon disposed for coaction with said first annular set of teeth;
said clutch means further including spring means for resiliently urging said jaw clutch member in a direction toward said first set of teeth for causing resilient meshing engagement of said first and second sets of teeth in response to axially shifting movement of said second gear; and
stop means fixedly secured to said second shaft, said spring means normally resiliently urging said jaw clutch member against said stop means when said second gear is in a first axial position and said first and second sets of teeth are disengaged, movement of said second gear axially toward said jaw clutch member causing said first set of teeth to contact said second set of teeth and move said jaw clutch member axially away from said stop means in opposition to said spring means, whereby said spring means causes said jaw clutch member to again move axially in the opposite direction to meshingly engage said first set of teeth when substantial speed synchronization is achieved therebetween.

5. A device according to claim 4, wherein the confronting faces of the first and second sets of teeth are each tapered relative to the rotational axis of said jaw clutch member for preventing premature engagement of the teeth prior to substantial synchronization therebetween.

6. A device according to claim 1, wherein said gear means further includes a third rotatable gear member supported on said shaft member and a fourth rotatable gear member substantially concentrically disposed relative to said second shaft member and positioned in continuous meshing engagement with said third gear member, said fourth gear member also being axially shiftable relative to said second shaft member and said clutch means further including third and fourth jaw clutch members coacting between said fourth gear member and said second shaft member for permitting selective driving engagement therebetween, said first and third jaw clutch members being fixedly interconnected to said second and fourth gear members, respectively, for rotation therewith, said second and fourth jaw clutch members being nonrotatably and concentrically mounted on said second shaft member in axially spaced relationship and each being movable axially relative to said second shaft member, asnd said resilient means coacting between said second and fourth jaw clutch member for resiliently urging said second and fourth jaw clutch members outwardly in opposite axial directions toward said first and third jaw clutch members, respectively.

7. A device according to claim 6, further including second stop means mounted on said second shaft member and coacting with said fourth jaw clutch member for limiting the axial outward movement thereof due to the urging of said resilient means, movement of said second gear member axially toward said second jaw clutch member causing said first jaw clutch member to contact said second jaw clutch member and move same axially in opposition to the urging of said resilient means for creating a resilient engaging force causing said second jaw clutch member to axially engage said first jaw clutch member when the speeds thereof are substantially synchronized, and axial movement of said fourth gear member toward said fourth jaw clutch member causing said third jaw clutch member to contact said fourth jaw clutch member and move same axially in opposition to the urging of said resilient means for creating a resilient engaging force causing said fourth jaw clutch member to axially meshing engage said third jaw clutch member when the speeds thereof are substantially synchronized.

8. In a transmission, the combination comprising:
a housing;
a plurality of spaced and substantially parallel countershafts mounted for rotation within said housing;
a plurality of countershaft ratio gears mounted on each of said countershafts, the individual ratio gears on one countershaft being grouped with and radially spaced from identical ratio gears on the other countershafts for defining countershaft gear groups;
means for supplying input power to each of said countershafts;
a driven shaft disposed between and substantially parallel with said plurality of countershafts;
a plurality of driven ratio gears disposed substantially concentrically of said driven shaft, each of said driven ratio gears being disposed in continuous meshing engagement with a respective one of said countershaft gear groups;
releasable clutch means associated with one of said driven ratio gears for selectively nonrotatably interconnecting same to said driven shaft, said clutch means including first and second jaw clutch members nonrotatably associated with said one driven gear and said drive shaft, respectively, said second jaw clutch member being axially slidably mounted on said driven shaft, and resilient means urging said second jaw clutch member in a direction toward said first jaw clutch member for creating a resilient engaging force to cause said jaw clutch members to relatively axially move toward one another and meshingly engage when the speed of said two jaw clutch members is substantially synchronized; and stop means coacting between said second jaw clutch member and said driven shaft for limiting the axial movement of second jaw clutch member, said resilient means including spring means resiliently urging said second jaw clutch member against said stop means, and said one driven ratio gear being axially shiftable relative to said driven shaft from a first position wherein said one driven gear is spaced from and out of engagement with said second jaw clutch member to a second position wherein said gear contacts said second jaw clutch member and axially displaces same in opposition to the urging of said spring means for creating a resilient clutch engaging force to cause the jaw clutch members to meshingly engage when the speeds thereof are substantially synchronized.

9. A change-speed gear device, comprising:

first and second substantially parallel shafts;

gear means drivingly connectible between said shafts for providing a plurality of alternately selectable speed ratios, said gear means including a first rotatable gear supported on said first shaft and a second rotatable gear substantially concentric with said second shaft and meshable with said first gear, said second gear being movable axially relative to said second shaft;

shift means connected to said second gear for selectably moving same axially relative to said second shaft;

clutch means for drivingly connecting said second gear to said second shaft in response to axial shifting of said second gear, said clutch means including a first annular jaw clutch portion nonrotatably connected with said second gear for rotation therewith and a second annular jaw clutch portion nonrotatably mounted on said second shaft for rotation therewith, said second jaw clutch portion being mounted for axial movement relative to said second shaft; and said clutch means further including spring means for resiliently urging said second jaw clutch portion in one direction toward said first jaw clutch portion for causing resilient meshing engagement of said jaw clutch portions in response to axial shifting movement of said second gear, movement of said second gear axially toward said second jaw clutch portion causing said first jaw clutch portion to contact said second jaw clutch portion and move said second jaw clutch portion in opposition to the urging of said spring means, whereby said spring means causes said second jaw clutch portion to again move axially in said one direction to meshingly engage said first jaw clutch portion when substantial speed synchronization is achieved therebetween.

10. A transmission according to claim 8, wherein said first jaw clutch member comprises a first set of internal teeth formed on said one driven ratio gear, and said second jaw clutch member comprises an annular collar nonrotatably mounted on said driven shaft and having a second set of external teeth formed thereon adapted for meshing engagement with the internal teeth formed on said one driven gear, said collar being splined to said driven shaft for permitting same to be axially displaced relative to said driven shaft, and the adjacent axial edges of said first and second sets of teeth each being tapered relative to the longitudinal axis of said driven shaft so as to define annular conical surfaces, said conical surfaces contacting and rotatably sliding relative to one another when said clutch collar is relatively moved into contact with said one driven gear prior to axial meshing engagement therebetween.

11. A transmission according to claim 8, wherein said clutch means includes a third annular jaw clutch member nonrotatably but axially slidably mounted on said driven shaft, said third jaw clutch member being axially spaced from said second jaw clutch member and said spring means being disposed therebetween for resiliently urging said second and third jaw clutch members axially in opposite directions, and a further driven ratio gear being mounted for axially shifting movement and having jaw clutch teeth formed thereon and adapted for meshing engagement with said third jaw clutch member when said further driven ratio gear is shifted axially relative to said driven shaft.

12. A device according to claim 8, wherein the driven ratio gears are supported in substantially concentric relationship relative to said driven shaft solely by the respective countershaft gear groups.

13. A transmission according to claim 8, wherein the countershafts having said plurality of gears thereon and said driven shaft having said plurality of driven gears surrounding same define a main transmission section providing a plurality of alternately selectable speed ratios, and further including a range transmission section connected in series with said main transmission section for providing still a further plurality of alternately selectable speed ratios.

14. A transmission according to claim 13, wherein said driven shaft extends continuously through both said main transmission section and said range transmission section, and said range section including a plurality of ratio gears concentrically and rotatably disposed about said driven shaft, an output shaft coaxial with said driven shaft, and gear means including said ratio gears for selectively drivingly interconnecting said output shaft to said driven shaft for alternately providing different speed ratios therebetween.

15. A change-speed gear transmission, comprising:

a main transmission section including gearing providing a plurality of alternately selectable speed ratios;

an auxiliary transmission section drivingly connected in series with said main transmission section and also including gearing providing a further plurality of alternately selectable speed ratios;

an elongated and structurally continuous main transmission shaft extending throughout both said main transmisssion section and said auxiliary transmission section, said main transmission shaft including an elongated main shaft section extending through said main transmission section and an elongated auxiliary shaft section extending through said auxiliary transmission section, said main shaft section and said auxiliary shaft section being axially aligned and fixedly connected;

said main transmission section including a plurality of main shaft gears disposed substantially concentric with and rotatable relative to said main shaft section;

said auxiliary transmission section including a plurality of axially shiftable main shaft gears disposed substantially concentric with and rotatable relative to said auxiliary shaft section;

first clutch means for selectively clutchably engaging, one at a time, the main shaft gears of said main transmission section to said main shaft, said first clutch means including resilient means for creating a resilient clutch engaging force; and second clutch means for selectively clutchably engaging, one at a time, the main shaft gears of said auxiliary transmission section to said main shaft, said second clutch means including resilient means for developing a resilient clutch engaging force.

16. A transmission according to claim 15, further including an output shaft substantially coaxially aligned with said main shaft, and one of said main shaft gears of said auxiliary transmission section being clutchable directly to both said output shaft and said main shaft.

17. A transmission according to claim 15, wherein said main transmission section includes a countershaft disposed substantially parallel to said main shaft, said countershaft having a plurality of countershaft gear disposed thereon in meshing engagement with the main shaft gears of said main transmission section; and said auxiliary transmission section also having a countershaft disposed substantially parallel with said main shaft, and a plurality of countershaft gears disposed on said countershaft and positioned in meshing engagement with the main shaft gears of said auxiliary transmission section.

18. A transmission according to claim 15, wherein said first and second clutch means each include a toothed collar non-rotatably but axially slidably mounted on said main shaft and resilient means coacting with each said collar for resiliently urging same in a direction toward a respective one of said main shaft gears.

19. A transmission according to claim 18, wherein at least some of said main shaft gears are axially shiftable relative to said main shaft for permitting same to be clutchably engaged to or disengaged from said toothed collars.

20. A transmission according to claim 15, further including an input shaft and an output shaft substantially coaxially aligned with said main shaft adjacent the opposite ends thereof, one of the main shaft gears of one of said transmission sections being axially shiftable relative to said main shaft for permitting said main shaft to be directly clutchably engaged to said input shaft, and one of the main shaft gears of said other transmission section being axially shiftable relative to said main shaft for permitting same to be directly clutchably engaged to said output shaft.

21. A transmission according to claim 15, wherein said main transmission shaft comprises a one-piece shaft member extending continuously throughout both said main transmission section and said auxiliary transmission section.

22. The device of claim 9 including also blocker means arranged operatively between said first and second jaw clutch portions.

23. The device of claim 22 wherein one of said jaw clutch portions is provided with projecting teeth axially spaced from the mutually contacting portion of said jaw clutch teeth and the blocker means positioned on said one of said portions is arranged for frictional engagement with the other of said portions and is effective to interfere with said projecting teeth and thereby interfere with axial movement of said one of said portions when said portions are rotating at nonsynchronous speeds with respect to each other.

24. The device of claim 9 wherein one of said portions has teeth projecting radially toward the other of said portions and blocker means is arranged on said teeth and frictionally engages the other of said jaw clutch portions;

means on said other of said jaw clutch portions limiting the distance said blocker can move axially away from said other of said jaw clutch portions.

25. The device of claim 9 wherein one of said portions has teeth projecting radially toward the other of said portions and blocker means is arranged on said teeth and frictionally engages the other of said jaw clutch portions;

resilient means constantly urging said blocker toward said other of said jaw clutch portions.

26. The device of claim 9 including also another similar gear and clutch arrangement spaced axially from said first-described gear and clutch arrangement, facing oppositely thereto and comprising third and fourth interengageable gears and third and fourth jaw clutch portions;

a blocker unit encircling each of said second and fourth clutch portions and frictionally engageable with adjacent surfaces respectively of said respective first and third gears and a single spring encircling said first-named spring means and contacting said blockers simultaneously and constantly urging both of them toward their respectively associated first and third gears.

27. The device of claim 15 wherein said main transmission section includes a plurality of jaw clutch units, each of which units includes a pair of jaw clutch components of which at least one is axially slidable, for effecting selection of said selectable speed ratios and blocker means arranged operatively between the respective jaw clutch components of each jaw clutch unit;

first control means effecting engagement and disengagement of said main transmission and second control means effecting engagement and disengagement of said auxiliary transmission and means for insuring disengagement of said auxiliary transmission prior to disengagement of said main transmission in at least selected shift sequences.

28. The device of claim 27 wherein said auxiliary transmission section comprises two pairs of gears having selectable ratios providing a step equal to approximately one-half of the step between a selected step in said main transmission section.

* * * * *

UNITED STATES PATENT OFFICE
CERTIFICATE OF CORRECTION

Patent No. 3,799,002           Dated March 26, 1974

Inventor(s)    Elmer A. Richards

Page 1 of 4

It is certified that error appears in the above-identified patent and that said Letters Patent are hereby corrected as shown below:

Column 1, line 24; change "provide" to ---improve---.
          line 25; change "produce" to ---reduce---.
Column 2, line 34; after "rapidity" insert ---of shifting---.
          line 68; after "ratios" insert ---and---.
Column 3, line 49; change "wil" to ---will---.
Column 4, line 29; change "rotatable" to ---rotatably---.
Column 5, lines 23 and 28, change "form" to ---fork---.
          line 40; change "therwith" to ---therewith---.
          line 64; change "end" to ---ends---.
Column 6, line 39; change "pain" to ---pair---.
Column 9, line 55; before "shiftable" insert ---each---.
Column 11, line 6; change "a" to ---the---.
          line 55; change "transmission" to ---transmissions---.
Column 12, line 26; after "clutch" insert ---means---.
Column 13, line 8; change "shaft" to ---shafts---.
          line 60; before "shaft" insert ---first---.
Column 14; line 8; change "asnd" to ---and---.
          line 32; change "meshing" to ---meshingly---.
          line 61; change "drive shaft" to ---driven shaft---.
Column 16; line 16; change "axially" to ---axial---.
Column 17; line 22; change "gear" to ---gears---.
Column 18; line 3; change "portion" to ---portions---.
          lines 17 and 24; after "blocker" insert ---means---.

UNITED STATES PATENT OFFICE
CERTIFICATE OF CORRECTION

Patent No. 3,799,002      Dated March 26, 1974

Inventor(s) Elmer A. Richards

It is certified that error appears in the above-identified patent and that said Letters Patent are hereby corrected as shown below:

Column 18, line 37; change "blockers" to ---blocker units---.

In the drawing, please amend Figure 5 so that same appears as set forth below:

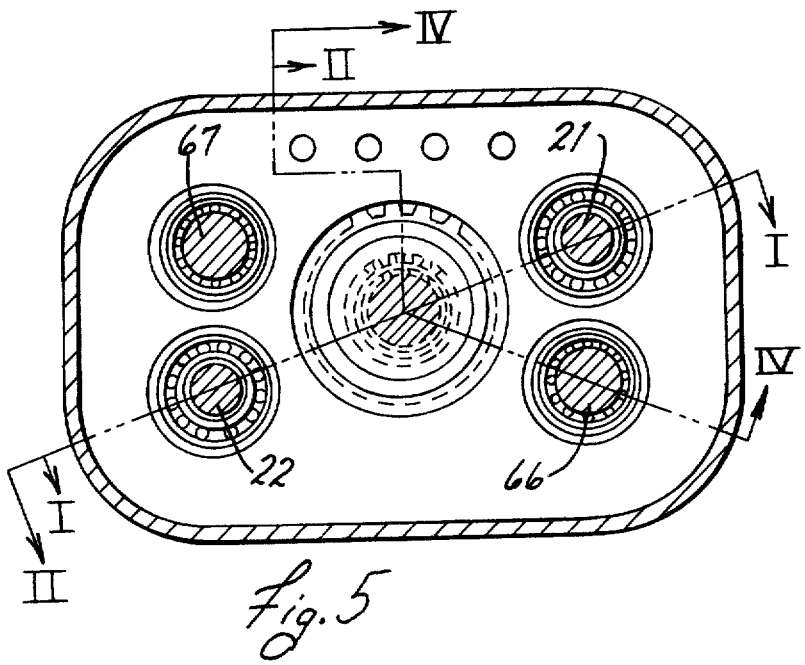

The sheets of drawings containing Figures 6-9 as shown on the attached sheets should be added.

Signed and Sealed this

Eleventh Day of January 1977

[SEAL]

Attest:

RUTH C. MASON  
Attesting Officer

C. MARSHALL DANN  
Commissioner of Patents and Trademarks